United States Patent [19]

Didion et al.

[11] Patent Number: 4,502,808
[45] Date of Patent: Mar. 5, 1985

[54] LINER SEGMENTS RETENTION MEANS

[75] Inventors: Charles J. Didion, St. Charles; Albert J. Meade, Ballwin, both of Mo.

[73] Assignee: Didion Manufacturing Company, St. Peters, Mo.

[21] Appl. No.: 378,984

[22] Filed: May 17, 1982

[51] Int. Cl.³ .............................................. F16B 3/04
[52] U.S. Cl. ..................... 403/24; 403/357; 403/294; 51/164.1; 164/401
[58] Field of Search ............. 51/164.1; 403/357, 331, 403/294, 372, 24; 164/401, 404, 131

[56] References Cited

U.S. PATENT DOCUMENTS

| | | | |
|---|---|---|---|
| 1,920,021 | 7/1933 | Schroeder | 403/290 |
| 1,998,649 | 4/1935 | Arden | 403/383 |
| 2,249,872 | 7/1941 | Turner | 403/354 |
| 3,369,425 | 2/1968 | Runkle et al. | 403/357 X |
| 3,438,660 | 4/1969 | Steiner | 403/357 |
| 3,998,262 | 12/1976 | Didion | 164/131 |

FOREIGN PATENT DOCUMENTS

| | | | |
|---|---|---|---|
| 69289 | 5/1949 | Denmark | 403/357 |
| 1073147 | 6/1967 | United Kingdom | 403/372 |

Primary Examiner—Andrew V. Kundrat
Attorney, Agent, or Firm—Paul M. Denk

[57] ABSTRACT

This invention relates to the formation of a resilient retention rod or pin that inserts intermediate a pair of liner segments of a tumbling or casting shake-out unit, and which rod is formed having a series of inherent angular bends provided along its length, and being constructed of resilient material, so that as the rod is forcefully inserted in place for retaining a pair of adjacent liner segments together, the tendency of the resilient rod to achieve its steady state angularly bent condition has a tendency to continuously force a pressure against adjacent segments to assure their tightness in interfitting together for forming the liner or cylinder for a casting shake-out unit or the like.

5 Claims, 4 Drawing Figures

LINER SEGMENTS RETENTION MEANS

BACKGROUND OF THE INVENTION

This invention relates generally to a retention means, and more specifically pertains to a particularly styled and resiliently formed pin or rod means that is capable of being press fitted intermediate adjacent segments of, as for example, the innerlining for a casting shake-out unit, and due to the inherent resiliency of the retention means continuously exerting a lateral force upon the adjacent segment edges to assure their tight fitting in forming the inner perforated surface for such an apparatus.

In the formation of a casting shake-out unit, or any other type of tumbling mill or the like, frequently it is desirable to form the cylinder from segmented components, so that upon their wear-out, as a result of continuous and repeated usage, the segments can be replaced quite easily and rapidly without incurring a significant amount of machinery or plant down time. An example of such a prior art unit is disclosed in the earlier U.S. Pat. No. 3,998,262, devised by one of the co-inventors herein, which shows a segmented formed inner cylinder for a casting shake-out unit. As explained in the prior patent, the internal cylinder forming the inner surface of the shown unit is constructed as sectionalized, having a series of modular components which during assembly are capable of fitting together to form the complete apertured surface internally of the device. The operations of that particular unit, for its intended purpose, has performed highly satisfactory. But, one minor problem that is incurred, and which is intended to be remedied by the type of invention disclosed herein, is that when the casting shake-out unit is operated continuously, wear has a tendency to cause the sectionalized components to gradually loosen, which then requires a retightening of the entire formed inner surface, as through a tightening of its ring member, tightening bolts, and springs, or other securing means, in order to urge the cylinder sections back again tightly into their interlocked condition so as to assure that the sectionalized surface does not become too loosened, break free, or become a hazard during operation.

An object of the current invention is to remedy upon some of these minor problems associated with the operation of this prior device, and at the same time provide a unique retention means that can be used in conjunction with any type of sectionalized surface, whether it be formed of simply two or multi components, the latter as shown in said earlier patent, and assure that the sectionalized surface forming the shake-out unit tumbling mill, or sand grader, or the like, will remain tightly in place, for a much longer period of time, due to the inherent resiliency of the retention rods or means that tightly bind the sectionalized surface together.

In view of the foregoing, it is the principal object of this invention to provide a retaining means that not only assures retention of at least contiguous segments of a component together, but at the same time, continuously pressures these segments into a tight interfitting relationship regardless of the amount of wear that may be encountered during prolonged usage of the apparatus in which the segments are embodied.

Another object of this invention is to provide a retention means, comprising either a rod or pin, and which is formed of resilient material that can forcefully pressure those components being held together into a tightly and more permanently fitting relationship.

Still another object of this invention is to provide a retention rod or pin that is formed having a rather angulated configuration and which is forced into closer lineal alignment through a forceful insertion intermediate components to be secured together.

Still another object of this invention is to provide a resiliently formed retention pin that is formulated from a particularly alloyed steel.

Yet another object of this invention is to provide a retention rod that incorporates high hardening attributes to assure its extensive useful life in resiliently biasing adjacent segments of an apparatus into a tight binding and fitting relationship.

These and other objects will become more apparent to those skilled in the art upon reviewing the summary of this invention, and upon undertaking a study of the description of its preferred embodiment in view of the drawing.

SUMMARY OF THE INVENTION

This invention contemplates the formation of a retention means, formed in the shape of a pin or rod, and useful for securing at least a pair of segments, or a plurality of segments, together into a composite unit. As previously alluded to, the rod is formed of resilient material, and has been found to operate highly successful in securing liner segments together, particularly of the type that is exposed to reasonably rough handling during usage as in a casting shake-out unit, of the type as previously explained.

To accommodate the type of resilient rod of this invention, to function as a retainer, the sectionalized segments forming the surface of the cylinder, along their edges, are formed having a groove, and into which the resilient rod of this invention may be forcefully inserted as a retainer. In addition, since it is a desirable feature from this invention to provide a retention rod that can continuously exert pressure upon the segment edges after enduring installation, the rods are formed having at least one or a series of slight angular bends in their formation, so as to maintain that undulating construction more permanently with the inherent resiliency of the rod having a tendency to seek that particular formation for attainment of its steady state condition. Thus, when the angulated resilient pin of this invention is tightly inserted under force intermediate a pair of adjacent segments, along their edges, it is forced from its angulated disposition into a more lineal alignment, and due to the inherent resiliency of the constructed pin, and its tendency to achieve its steady state condition, that being the one having a series of angulated bends in it, it has a tendency to continuously urge a force against a segment edges, tightly binding the segments surface into a more compact formation and unit.

In the construction of this pin, it has been found desirable, but not absolutely essential, that it be formed of a carbon steel, and preferably one including some percentage of the ingredient of carbon, in addition to manganese, chromium, and molybdenum. Then, the pin or rod is case hardened to assure its inherent resiliency and length to perform its intended function. More specifically, it has been found desirable to include carbon in an amount of 0.48% to 0.53%, by weight, in addition to adding manganese at a percentage by weight of between about 0.75% to 1.00%. Chromium is added at the percentage of 0.80% to 1.10%, while molybdenum is an added ingredient of between about 0.15% to 0.25%. Obviously, other variations of percentages for these various ingredients, in addition to either one or more of these ingredients being included, within the basic steel component will probably work quite effectively for the intended purpose of this particular retention rod.

DESCRIPTION OF THE PREFERRED EMBODIMENT

Figure 1:
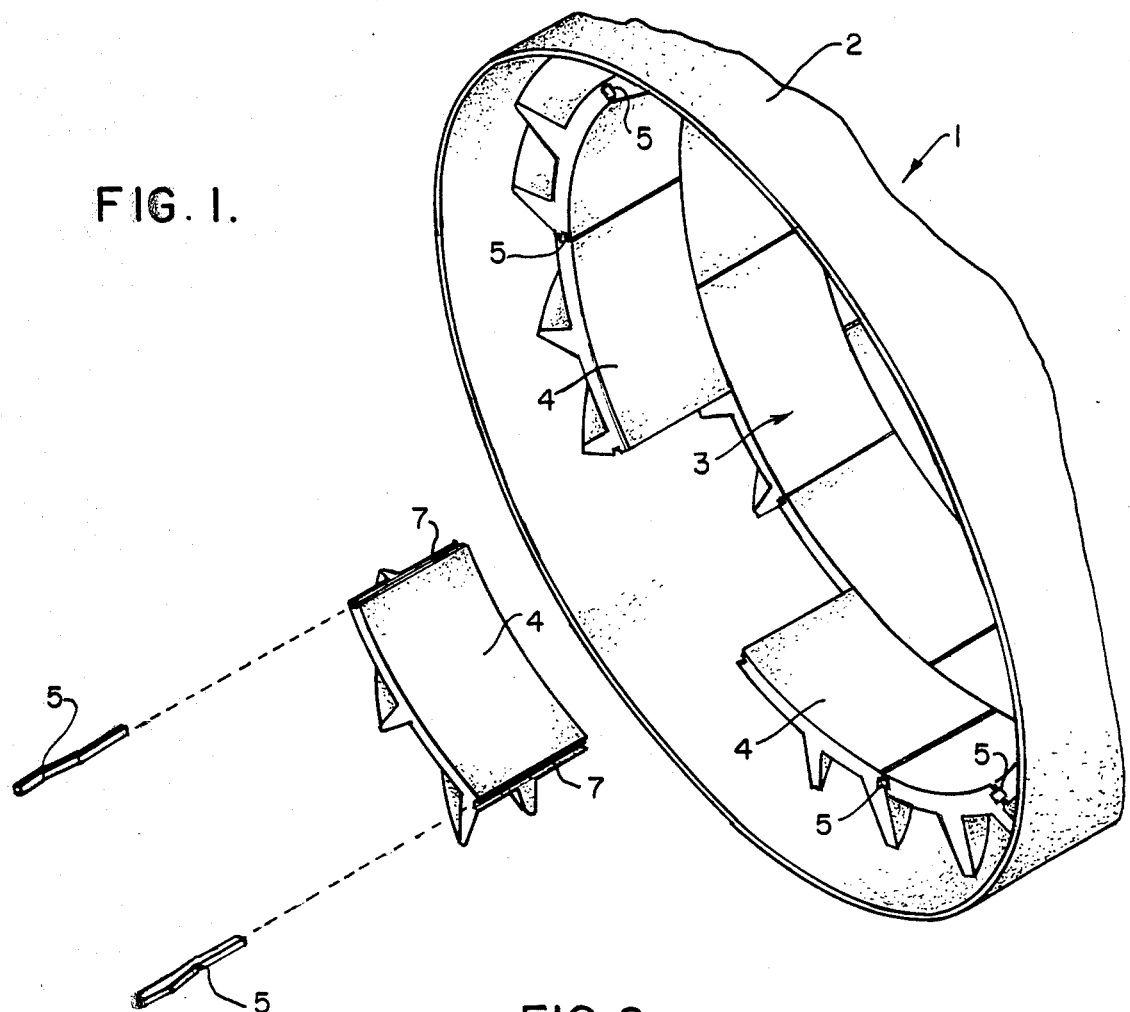
FIG. 1 discloses a partial view of one end of a tumbling unit, such as a casting shake-out unit, and further disclosing in an exploded view one removed liner segment and the retention pins of this invention that normally secure it into a liner surface.

In referring to the drawings, and in particular FIG. 1, there is disclosed a cylindrical type of device 1 in which the retention rod of this invention finds utility, with the device 1 being either a tumbling mill, sand cooling unit, or in this particular instance, comprising a casting shake-out unit that is useful in the foundry art for removing sand from the castings after their separation from the mold. As shown, such unit usually includes an outer cylinder 2 which locates therein, an inner cylindrical surface 3 which in this particular instance, is formed of a series of liner segments 4 which mate together to form the inner cylindrical surface for the shake-out unit of the particular shown apparatus.

The retention means of this invention includes a rod or pin like member 5 which, as previously explained, is useful for tightly securing in a more permanent fashion these liner segments 4 together.

Figure 2:
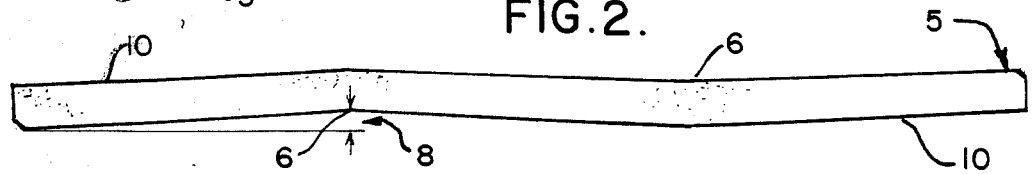
FIG. 2 provides a top view of one of the retention rods of this invention.
Figure 3:
FIG. 3 provides a side view of the retention rod of FIG. 2.

As further shown in FIGS. 2 and 3, these rod means 5 are formed having a length equal to or perhaps slightly less than the length of each segment 4, and each rod is formed having slight angular bends, as at 6, along its length, and permanently formed in that manner. And, since the rods are constructed of the metallic type of material as previously delineated, they inherently retain a lasting resiliency that has a tendency to maintain the rods into their steady state shape and position as more accurately disclosed in FIG. 2.

Figure 4:
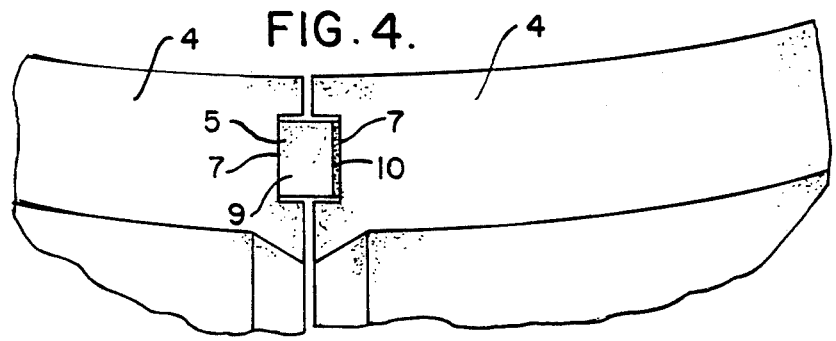
FIG. 4 discloses an end view of a part of a pair of adjacent liner segments disclosing the retention rod of this invention being forcefully inserted therein.

Thus, in view of the foregoing, when a pair of liner segments 4 are brought into their circular alignment, as shown in FIG. 4, each segment is formed having a groove or slot, as at 7, formed along their adjacent edges, and of a size to accommodate the forceful insertion therein of one of the rod members 5. As this is being performed, and due to the forceful insertion of a rod member therein, and since the width between the back surfaces of the grooves 7 is less than the overall width of a rod 5, by design, as the retention rod member is forced into position within the adjacent grooves 7 of each segment the rod is deformed from its configuration as shown in FIG. 2, and forced into a more lineal alignment, while locking a pair of liner segments together. As this occurs, there is a natural tendency under the resiliency of the rod member 5 to continuously be urged into its steady state and angled configuration, as shown in FIG. 2, which means that the rod is continuously exerting lateral force against the groove 7, thereby forcing the liner segments 4 apart. Thus, as every retention rod 5 is located in place, around the perimeter of the liner surface, they each accumulatively urge a force against their contiguous liner segments, in biasing them apart, which means that this added force as sustained and urged upon the formed liner has a tendency to bind the surface into a locked position under continuous pressure. And, as the casting shake-out unit is continuously used in operation, for separating sand from their castings, and as the surface begins to wear, any looseness that develops between liner segments will be compensated for by the tendency of the retention means 5 to continuously exert its lateral force against and within the liner segment grooves 7, as previously explained, which means that this locking force is more permanent, and retains the inner segment securely and integrally together into their locked position regardless that the surface may be wearing due to repeated abrasive and impacting contact with the castings riding thereon.

As can be seen in FIG. 2, the angular relationship between the various parts along the length of the retention rod 5 are formed at a slight angular degree with respect to each other, perhaps between one to five degrees (1° to 5°) or more, off of the lineal alignment of the axis of the rod, and provides sufficient distance, as through the dimension 8, as shown, for the rod to flex when forcefully locked and inserted into its retaining position between a pair of adjacent liner segments 4. Thus, until the liner segments wear to that degree where the retention rod achieves its steady state condition, as shown in FIG. 2, the rod will continuously urge a force laterally against the abutting edges of the segments 4 so as to assure that a continuous force is being exerted upon the shown liner segments and to prevent them from attaining looseness in their disposition for forming the inner surface of a casting shake-out unit.

Obviously, the various disposition of the liner segments within the unit may change from that position as shown in FIG. 1, where they are disclosed staggered, and it is just as likely that the segments may be aligned with each other along the length of the housing cylinder. Or, it is further likely that the cylinder segments may be of greater circumference, perhaps to within a third and a half of the formed inner surface of the unit, and yet be conveniently locked into position by means of the resilient and preformed angulated retention rod as disclosed in FIGS. 2 and 3.

It is to be noted in FIG. 4 that while the end 9 of the rod 5 is disclosed, a portion of the side edge surface 10 is likewise disclosed in its contiguous relationship against the grooves 7 of the liner segments.

Variations or modifications to the structure of the rod or pin of this invention may occur to those skilled in the art upon reviewing the subject matter herein disclosed, and any such variations or modifications, if within the spirit of this invention, are intended to be encompassed within the scope to any claims to patent protection issuing upon this invention. The description of the preferred embodiment set forth herein is done so for illustrative purposes only.

Having thus described the invention what is claimed and desired to be secured by Letters Patent is:

1. A liner segment retention means for use in holding a pair of adjacent liner segments for a casting shake-out unit affixed together, comprising, a pair of adjacent liner segments for a casting shake-out unit, said unit being of cylindrical design, each segment having a groove formed along adjacent side edges and aligned to form an opening between said adjacent segments, a retention means for holding said segments of the liner in their installed position, to assure tight retention of said segments in place even after prolonged usage would otherwise loosen them with respect to each other, said retention means comprising a length of resilient material insertable into intermediacy between the abuting edges of adjacent segments and into the opening formed therebetween, said length of resilient material being turned from alignment at least at one location to provide for its give and deformation when driven into its retaining position between adjacent segments, and upon wearing of the said segments the resiliency of the said length of material urging itself towards its angulated steady state condition and continuing to tightly bind against the said adjacent segments for maintaining their tight securement together during installation and usage of the casting shake-out unit, said retention means formed of a resilient material comprising a length of rod means, said rod means being formed of a resilient steel, said rod means including a series of slight angular bends providing undulating surface deformation under force to bind and retain the adjacent liner segments into tight installation, whereby said segments comprising sections of modular components forming the inner perforated cylinder of the casting shake-out unit that are rigidly secured together during the units operation.

2. The invention of claim 1 and wherein said undulating surfaces extend their angular bends in two opposite dimensions.

3. The invention of claim 2 and wherein said resilient length of rod means is formed of a composite of steel, carbon, manganese, chromium, and molybdenum.

4. The invention of claim 2 and wherein each formed angular bend of the retention rod is formed between one degree (1°) and at least five degrees (5°).

5. The invention of claim 1 and wherein said rod means having a length not greater than the length of the associated segments.

* * * * *